(12) United States Patent
Kavumpurath

(10) Patent No.: US 11,651,315 B2
(45) Date of Patent: *May 16, 2023

(54) INTELLIGENT DIVERSIFICATION TOOL

(71) Applicant: VISA INTERNATIONAL SERVICE ASSOCIATION, San Francisco, CA (US)

(72) Inventor: Naiju Kavumpurath, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/213,963

(22) Filed: Mar. 26, 2021

(65) Prior Publication Data
US 2021/0216936 A1 Jul. 15, 2021

Related U.S. Application Data

(63) Continuation of application No. 15/991,073, filed on May 29, 2018, now Pat. No. 11,080,639.

(51) Int. Cl.
*G06Q 10/00* (2012.01)
*G06Q 10/0637* (2023.01)
*G06Q 10/067* (2023.01)
*G06Q 10/0635* (2023.01)
*G06N 7/00* (2023.01)
(Continued)

(52) U.S. Cl.
CPC ... *G06Q 10/06375* (2013.01); *G06F 16/2458* (2019.01); *G06F 16/2465* (2019.01); *G06N 7/00* (2013.01); *G06N 20/00* (2019.01); *G06Q 10/067* (2013.01); *G06Q 10/0635* (2013.01); *G06N 5/003* (2013.01); *H04L 67/5651* (2022.05)

(58) Field of Classification Search
None
See application file for complete search history.

(56) References Cited

U.S. PATENT DOCUMENTS 6,226,623 B1 * 5/2001 Schein ............... G06Q 30/02
709/217
7,630,986 B1 * 12/2009 Herz ............... G06Q 30/0603
707/999.009

(Continued)

OTHER PUBLICATIONS

Dahlberg, Tomi, et al. "Mobile payment market and research-past present and future." Helsinki mobility roundtable (2006). (Year: 2006).*

(Continued)

*Primary Examiner* — Gurkanwaljit Singh
(74) *Attorney, Agent, or Firm* — K&L Gates LLP

(57) ABSTRACT

A machine-learning tool evaluates an acquirer's current portfolio and then develops a model portfolio that mathematically redistributes the effect of the current portfolio by suggesting business categories that would better serve the acquirer from a risk/reward perspective. The machine-learning tool is trained with model portfolios and then generates a suggested portfolio that incorporates the acquirer's current partners and supplements them with additional business categories that would improve the risk/reward metric. The machine-learning tool may also select specific businesses from within the suggested business categories for the acquirer to use in achieving the suggested improvement.

14 Claims, 10 Drawing Sheets

(51) Int. Cl.
  *G06N 20/00* (2019.01)
  *G06F 16/2458* (2019.01)
  *G06N 5/00* (2023.01)
  *H04L 67/5651* (2022.01)

(56) References Cited

U.S. PATENT DOCUMENTS

| | | | | |
|---|---|---|---|---|
| 8,417,715 | B1* | 4/2013 | Bruckhaus | G06Q 10/04 705/26.1 |
| 11,080,639 | B2 | 8/2021 | Kavumpurath | |
| 2001/0005829 | A1* | 6/2001 | Raveis, Jr. | G06Q 30/02 705/316 |
| 2007/0094181 | A1 | 4/2007 | Tayebnejad | |
| 2009/0132347 | A1* | 5/2009 | Anderson | G06Q 30/02 705/30 |
| 2010/0332373 | A1* | 12/2010 | Crabtree | G06Q 40/04 709/224 |
| 2012/0190386 | A1* | 7/2012 | Anderson | G01S 19/14 455/456.3 |
| 2015/0032589 | A1 | 1/2015 | Adjaoute | |
| 2015/0046224 | A1 | 2/2015 | Adjaoute | |
| 2015/0046332 | A1 | 2/2015 | Adjaoute | |
| 2015/0073981 | A1 | 3/2015 | Adjaoute | |
| 2015/0324919 | A1* | 11/2015 | Riggs | G06Q 40/06 705/36 R |
| 2016/0162917 | A1* | 6/2016 | Singh | G06Q 30/0204 705/7.33 |
| 2017/0242825 | A1* | 8/2017 | Riggs | G06F 16/287 |
| 2017/0330205 | A1* | 11/2017 | Belanger | G06Q 30/0201 |
| 2019/0066133 | A1* | 2/2019 | Cotton | G06F 17/11 |
| 2020/0250185 | A1* | 8/2020 | Anderson | G06Q 30/01 |

OTHER PUBLICATIONS

Guttman, Robert H., and Pattie Maes. "Agent-mediated integrative negotiation for retail electronic commerce." International Workshop on Agent-Mediated Electronic Trading. Springer, Berlin, Heidelberg, 1998. (Year: 1998).*
Pivk, Aleksander, and Matjaž Gams. "Intelligent Agents in E-commerce." Electrotechnical Review 67.5 (2000): 251-260. (Year: 2000).*
Rosaci, Domenico, and Giuseppe ML Sarnè. "Multi-agent technology and ontologies to support personalization in B2C E-Commerce." Electronic Commerce Research and Applications 13.1 (2014): 13-23. (Year: 2014).*
Palopoli, Luigi, Domenico Rosaci, and Giuseppe ML Sarnè. "Introducing specialization in e-commerce recommender systems." Concurrent Engineering 21.3 (2013): 187-196. (Year: 2013).*
Office Action dated Aug. 27, 2020 for U.S. Appl. No. 15/991,073 (pp. 1-15).
Stephen, I. "Perceptron-Based Learning Algorithms." IEEE Transactions on Neural Networks 50.2 (1990): 179, 14 pages.
Office Action dated Feb. 18, 2021 for U.S. Appl. No. 15/991,073 (pp. 1-5).
Notice of Allowance dated Apr. 6, 2021 for U.S. Appl. No. 15/991,073 (pp. 1-9).

* cited by examiner

350

Analysis of Transactions for XYZ Financial

| Market Segment | Transaction Value | Transaction Count | Fraud Rate | Chargeback Rate |
|---|---|---|---|---|
| Gambling | 1,000,320 | 13,000 | 8.731% | 2.737% |
| Fuel | 1,200,020 | 3,000 | 5.231% | 0.534% |
| Food/Drug | 1,200,000 | 1,992,000 | 2.231% | 0.934% |
| Health | 80,001 | 1,200 | 1.351% | 0.334% |
| Telecom | 900,000 | 4,000 | 1.331% | 0.834% |
| Travel | 500,000 | 3,000 | 1.231% | 0.834% |
| Restaurants | 2,184,910 | 8,302 | 1.079% | 0.559% |
| Retail | 700,000 | 600 | 0.153% | 0.053% |
| Government | 600,000 | 3,000 | 0.123% | 0.183% |

Start IDT

Recommended Portfolio for XYZ Financial

| Market Segment | % Total Volume | Fraud Rate |
|---|---|---|
| Automotive | 6% | 1.3% |
| B2B | 1% | 2.3% |
| Entertainment | 15% | 1.3% |
| Food & Drug | 4% | 2.3% |
| Fuel | 7% | 3.3% |
| Gambling | 1% | 4.2% |
| Government | 6% | 0.1% |
| Health | 5% | 1.4% |
| Home Improvement | 3% ▲ ▼ | 1.3% |
| Restaurants | 12% | 1.1% |
| Retail | 6% | 0.2% |
| Telecom | 1% | 1.3% |
| Travel | 33% | 1.2% |

Return

Fig. 9

INTELLIGENT DIVERSIFICATION TOOL

CROSS-REFERENCE TO RELATED APPLICATIONS

This application is a continuation application claiming priority under 35 U.S.C. § 120 to U.S. patent application Ser. No. 15/991,073, filed on May 29, 2018, the entire contents of which are incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The process of receiving payment information from a merchant or online vendor is handled by a merchant acquirer ("acquirer") also known as a processor or a payment gateways. Acquirers act as middlemen between the merchants, the merchant's bank, payment networks, and/or the consumer's bank for a purchase of a good or service using a payment card. While some acquirers are very large, most acquirers are relative small and may have a specific focus, for example, a product-type or a geographic region. An acquirer's business may depend on achieving a correct balance of merchants to maximize profit and reduce risk. However, the computer tools available for acquirers to view and analyze risk are often lacking because of the limits on data access.

SUMMARY

In an embodiment, an acquirer tool has increased leverage for data acquisition and analysis. This increased leverage allows machine learning (ML) algorithms to analyze high volumes of data in view of the acquirer's characteristics including current risk and fraud ratios, geographic coverage, business types, and non-aligned merchants. The ML algorithms may first evaluate the acquirer's current portfolio to determine a baseline of volume, fraud, and chargebacks. The ML algorithms then begin a process of identifying model business categories that would improve the acquirer's portfolio with respect to the value, volume, fraud, and chargebacks statistics. Finally, the ML algorithm may match the model businesses to actual business with which the acquirer does not currently have a relationship. The process may include presenting a graphical interface detailing the ML algorithm's results and feeding the acquirer's comments back into the ML algorithm to further train the ML engine 166 to more accurately reflect the user's perception of ideal. In some embodiments, the engine 166 may have separate training weights to reach similar but perhaps slightly different goals based on an acquirer's historical preferences, risk aversion, etc.

The acquirer tool may be a stand-alone application accessed by an acquirer or may be integrated into an existing customer relationship management (CRM) tool via an application program interface (API). In an embodiment, the acquirer tool may be operated by a payment network, allowing data from a wide variety of businesses to be included in the recommendation process.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

FIG. 7 illustrates a user interface of showing a tabular view of a portfolio analysis;

FIG. 9 illustrates an exemplary user interface showing a tabular view of a model portfolio.

DETAILED DESCRIPTION

At a high level, a system may perform an analysis of a first dataset and may return a target dataset using an AI/ML engine to optimize for selected factors. The target dataset may be generated by supplementing the first dataset with additional elements to balance or offset outlier data elements of the first dataset. In an embodiment, the first dataset may be a collection of merchants associated with a merchant acquirer or acquirer. For the purpose of this disclosure, no distinction is made between acquiring transactions for an online merchant and a brick and mortar merchant.

Figure 1:
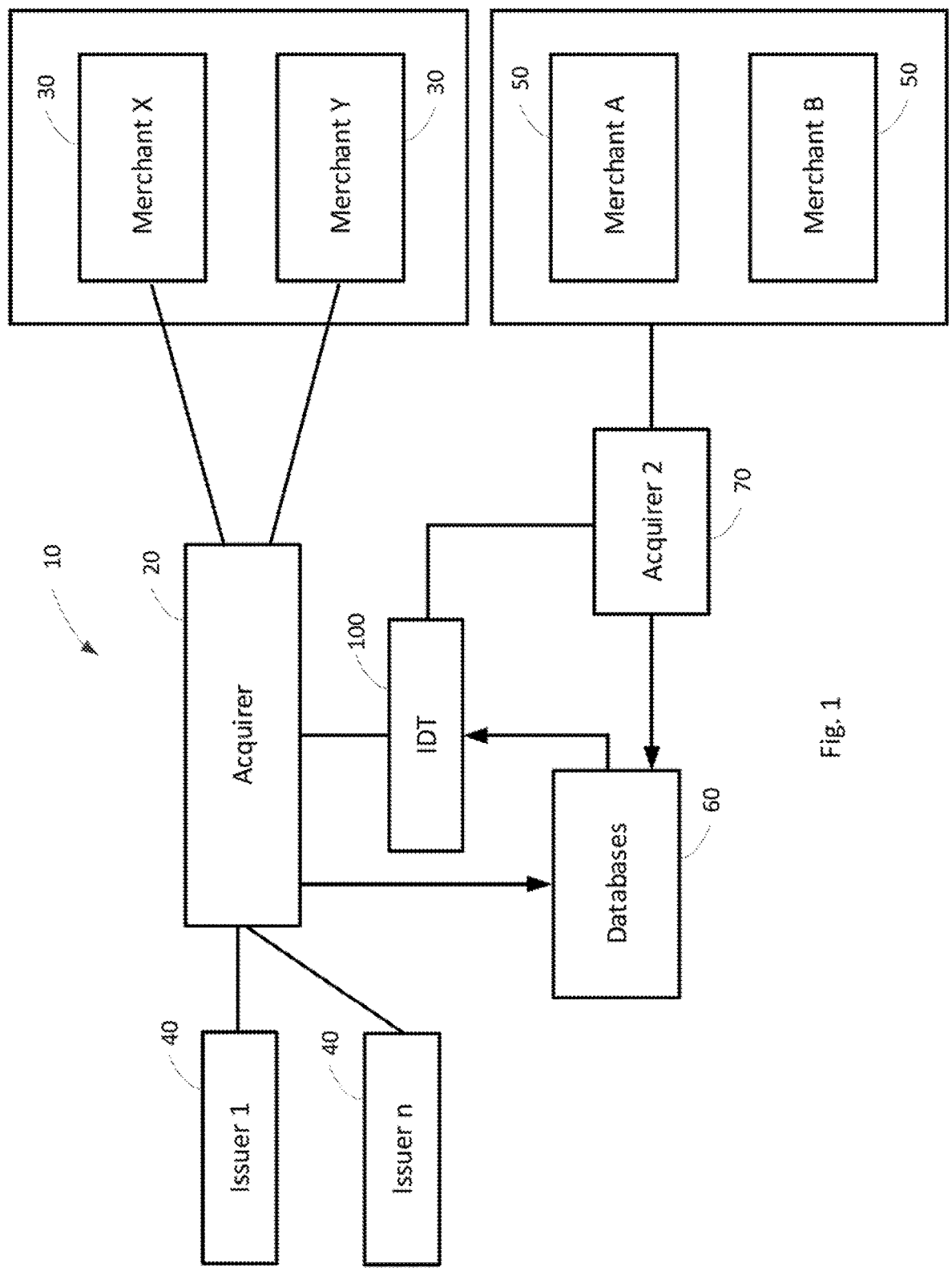
FIG. 1 is a block diagram of an environment supporting intelligent portfolio diversification in accordance with the current disclosure.

FIG. 1 illustrates an environment 10 for operating the intelligent diversification tool (IDT) 100. An acquirer 20 may be connected to a first group of merchants 30 for which the acquirer 20 processes transactions. During a transaction, the acquirer 20 may receive transaction information from the merchant 30, communicate with an appropriate issuer 40 to authorize and then later clear the transaction. This data may be stored into one or more databases 60. As more information about the transaction becomes available, such as the time to settle, identification of the transaction as fraudulent, or reversing the transaction, such as a reversal caused by a return of the purchased item. In this exemplary illustration, the databases 60 may capture transaction information for other merchants 50 who use a different acquirer 70. The databases 60 may allow each acquirer 20, 70 to add and view data associated with their respective merchants 30, 50. However, data from the databases 60 from both acquirers 20, 70 may be viewable by the IDT 100. Either acquirer 20, 70 may be able to access the IDT 100 as described in more detail below. Further, transaction data from both acquirers 20, 70 may be used for training the machine learning engine, also discussed more below. The acquirers 20, 70 represent a real world field of hundreds or more acquirers that may benefit from use of the IDT 100.

Figure 2:
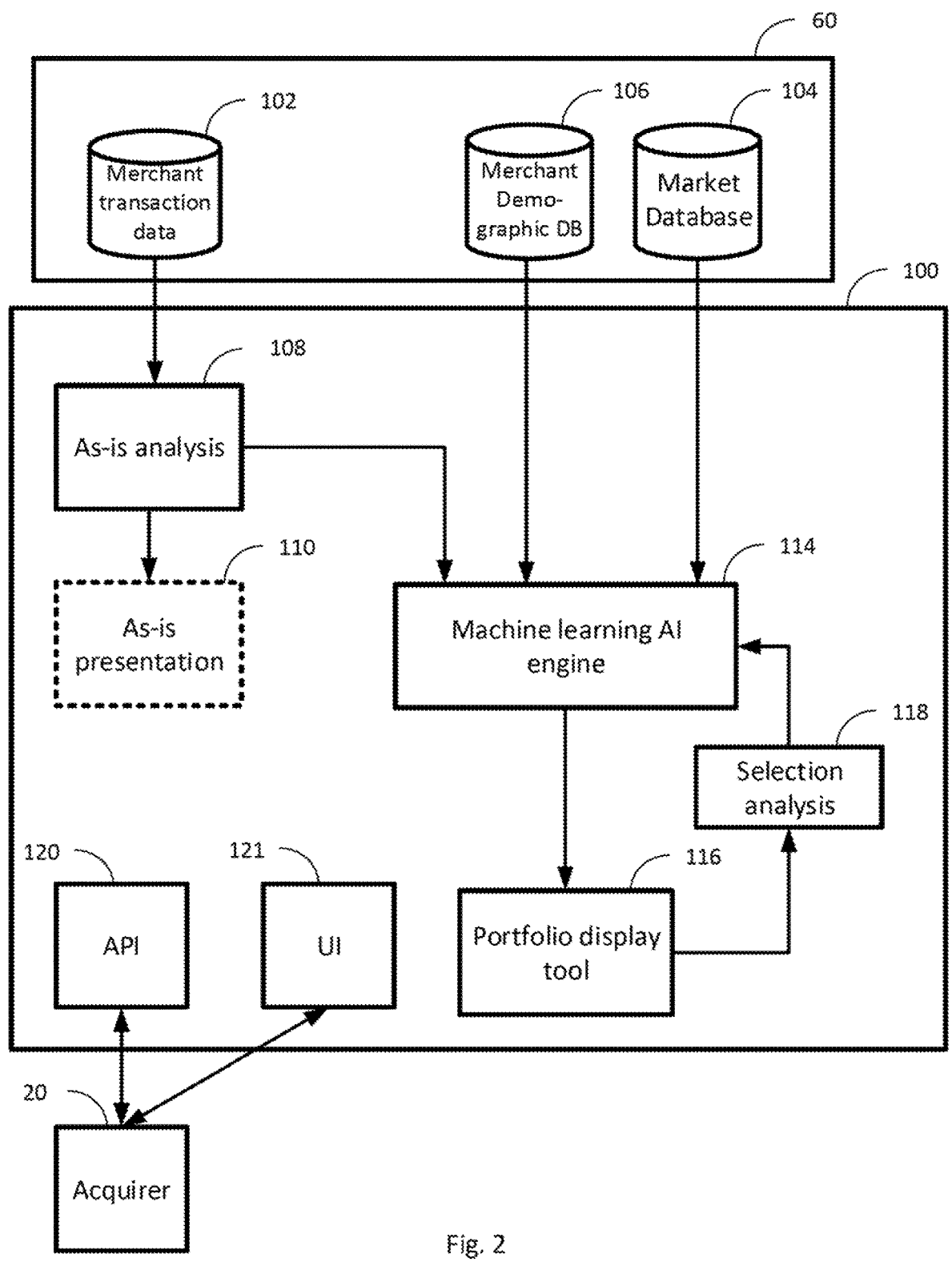
FIG. 2 is a block diagram illustrating components of an intelligent portfolio diversification tool.

Turning to FIG. 2, a block diagram of components in and associated with an intelligent diversification tool (IDT) 100 may be illustrated. The tool 100 may include various processors or modules associated with particular functions of the tool 100. In some embodiments, purpose built physical equipment may be part of the system. In other embodiments, software may be used to physically configure one or more processors, which may be local or may be remote such as in a cloud of remote computing devices which may be accessed over a network communication link.

Databases 102, 104 and 106 may be associated with the FIG. 1 databases 60. In various embodiments, the databases 102, 104, 106 may be a single database, may be a distributed database, may be cloud instances of data storage facilities, or other physical configurations of databases. In an embodiment, the database 60 may be a single data schema and the individual data represented by databases 102, 104 and 106 may simply be queries on the overall database 60.

The IDT may include an application program interface (API) 120 that allows programmatic communication between the IDT 100 and one or more acquirers 20. The API 120 may expose methods available to the acquirer 20, for example, to request an as-is presentation 110 discussed below or to initiate an analysis process. The API 120 may also be implemented using a Representational State Transfer or "REST" interface. The API 120 may require authentication so that access to transaction data may be limited to those to whom the data belongs or to those to which access has been granted. In use, the API may expect known commands in known formats and may respond with a predetermined response in a predetermined format. The response may follow a predetermined data structure such as certain bits being dedicated to providing predetermined information. As a result, communication may be efficient and reliable as the data into and out of the API may in known formats and with expected results.

In the illustrated exemplary embodiment, the IDT 100 may include an as-is analysis processor 108 that may collect data from a merchant transaction database 102. The merchant transaction database 102 may include all transactions processed by the acquirer 20.

The as-is analysis processor 108 may activate responsive to an event requesting activation of the IDT 100. The processor 108 may request data over a given date range or may use a predetermined range such as the previous one year. In an embodiment, an acquirer 20 may set a date range that corresponds to a current portfolio of merchants 30 so that the results of the as-is analysis may more drive a more accurate recommendation from an ML/AI engine 114.

Optionally, the output of the as-is analysis processor 108 may drive a presentation generator 110 that generates tabular or graphical output according to one or more data templates. Turning briefly to FIG. 7, an exemplary tabular display 350 generated by the presentation generator 110 may be illustrated. A window 352 may contain the table 354 illustrating a summary of transactions for the acquirer XYZ Financial. The table 354 may show industry/market segments representing merchant categories. The merchant categories may be based on the Merchant Category Code (MCC) as assigned by the individual merchant's bank. The table 354 may show transaction value and transaction count as a way for the acquirer to quickly compare volumes vs. values. The fraud rate may illustrate how many of the transactions were later disputed, for example, as having been associated with a stolen credit instrument. The chargeback rate may indicate a rate at which the transactions are reversed, such as by disputed transactions for which the retailer will not honor a refund. Overall, the table 354 may provide the acquirer an idea of where and how their transaction values and risks are allocated among their current clients.

A button 356 may allow the acquirer to execute the intelligent diversification tool (IDT) 100, as discussed more below.

Figure 8:
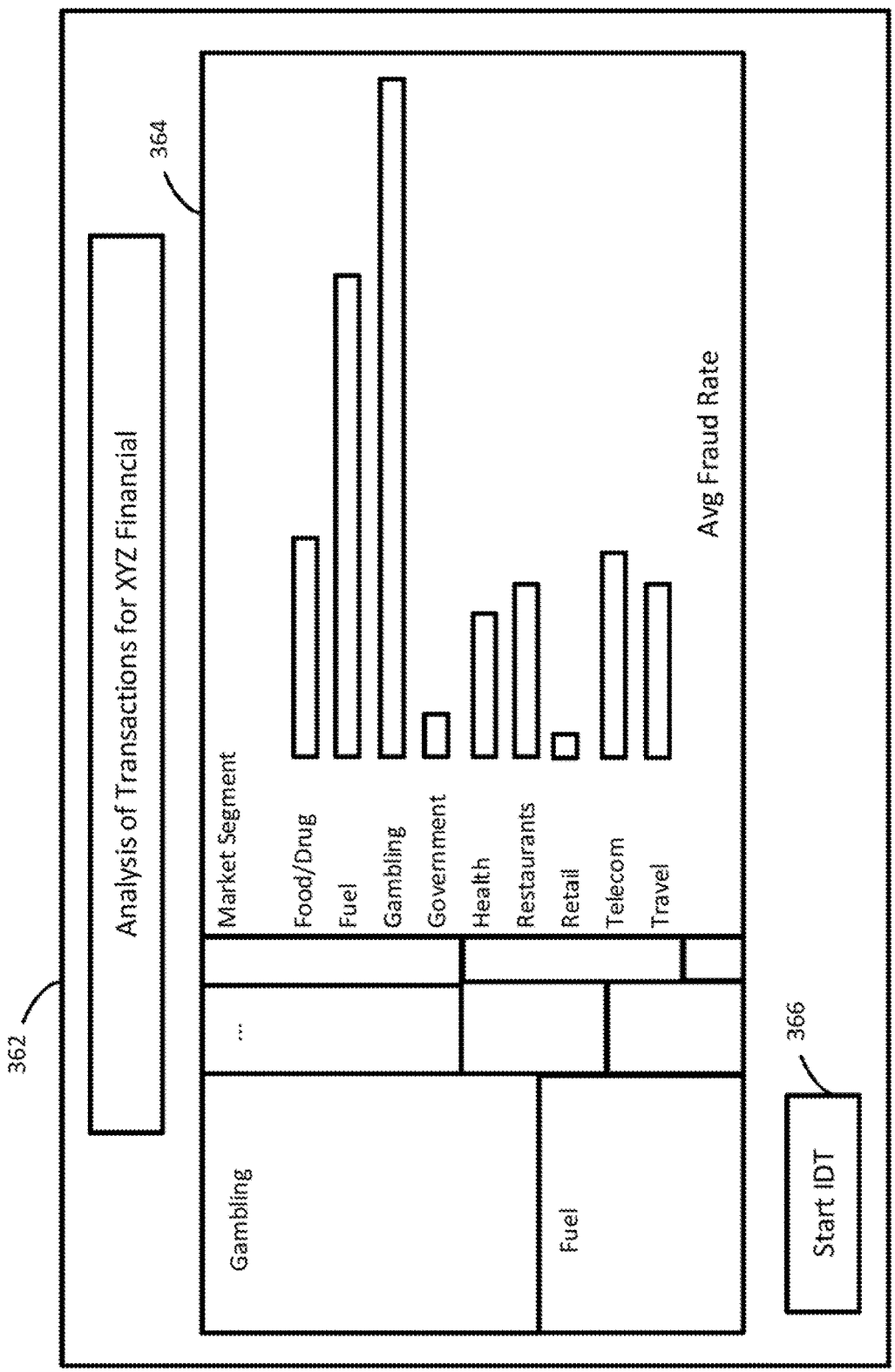
FIG. 8 illustrates a user interface showing a graphical view of a portfolio analysis.

FIG. 8 may illustrate a graphical view 362 of one value of transaction data, in this case, fraud rate. The length of the bar and corresponding size of the box may illustrate the comparative values for each of the categories. Other transaction data may be illustrated graphically, or combinations may be developed such as double bars for each category illustrating fraud rate and total transaction value. In an embodiment, a user may select a preferred output style according to a menu selection (not depicted).

Returning to FIG. 2, whether or not the acquirer 20 views a tabular or graphical presentation of the current state, the results from the as-is analysis processor 108 may be passed to a machine learning artificial intelligence (ML/AI) engine 114. The data processing associated with the ML/AI engine 114 is discussed in more detail below, but in general, the engine 114 gathers additional data from a market database 104 of broad transaction statistics, that is, transactions beyond those available to the acquirer 20. Further, the engine 114 may optionally use demographic statistics about the current acquirer 20 to further inform recommendations, such as limiting selections to a particular geographic region where acquirer currently operates.

The ML/AI engine 114 may generate a recommended portfolio by MCC classification illustrating how the current portfolio may be restructured or supplemented to improve risk factors including fraud and chargebacks. However, because in some cases, higher risk merchants may pay a higher rate for transaction processing, there may be situations where some portfolios are so conservative that the engine 114 may recommend the addition of higher risk categories to improve the overall profitability of the acquirer.

The output of the engine 114 may be illustrated in graphical or tabular form for review by the acquirer 20. For example, FIG. 9 may illustrate a tabular view 380 of a window 382 illustrating a recommended portfolio 384. The recommended portfolio 384 may include both new classifications and recommended volume breakdowns among categories. In an embodiment, the recommended portfolio 384 may retain the current volume and value levels of the original portfolio but may reduce or reallocate the total percentage of high risk categories by increasing the volume and/or value of other categories. In the illustrated embodiment, a category may selected and a figure of merit, in this case, percentage of total volume may be increased or decreased so that another mix of values may be generated. A return button 386 may provide one avenue of leaving the tabular view screen. In other embodiments, printing to paper or conversion to a document format may also be provided.

Figure 10:
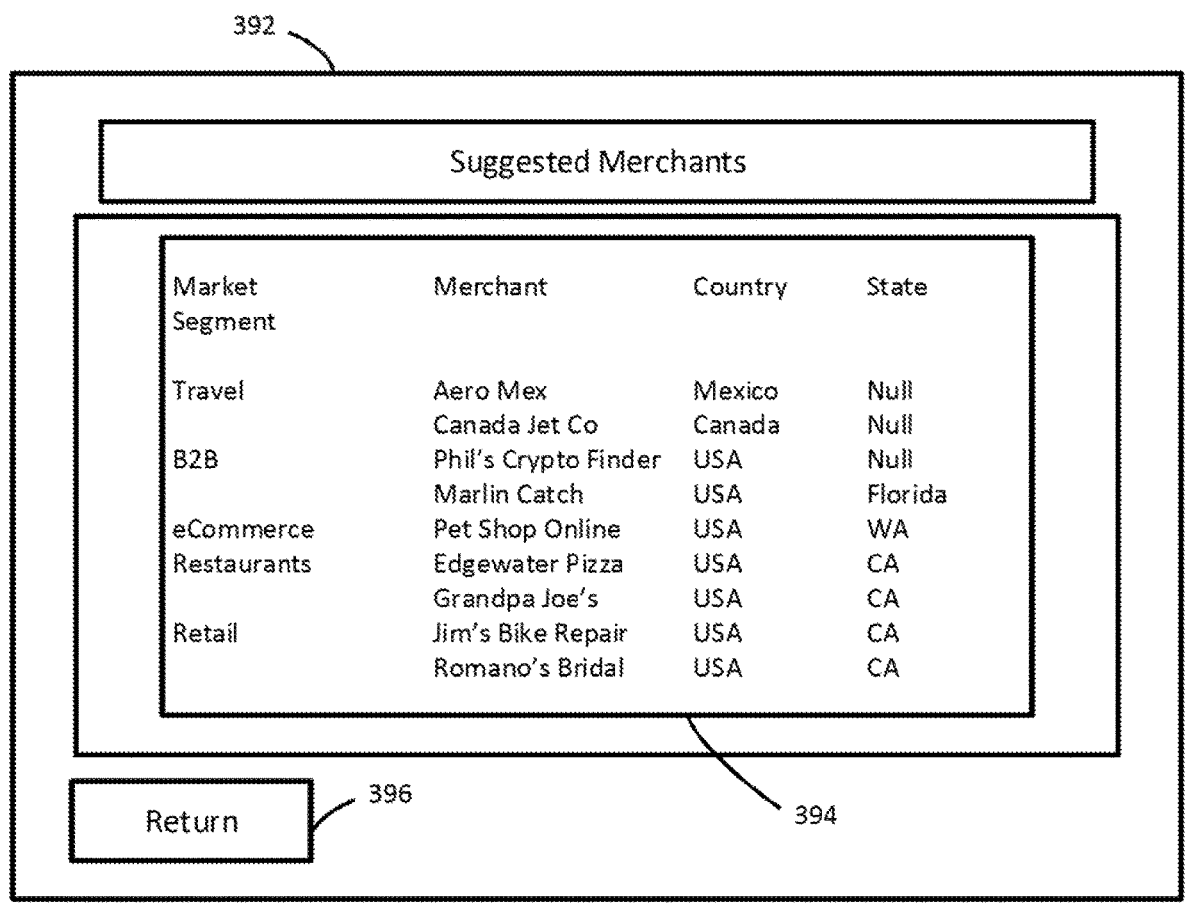
FIG. 10 illustrates an exemplary user interface showing recommended merchants by category.

In one embodiment illustrated in FIG. 10, the ML/AI engine 166 may also provide a tabular view 390 with a window 392 showing actual merchant names 394 from within the target categories generated in the initial recommendation shown in FIG. 9. The merchant names 394 may be screened to exclude those merchants which that are already affiliated with a payment processor or network supplying the market database 104 to avoid cannibalization of merchants already in a particular payment ecosystem. Other views of the merchant recommendations may be supported. For example, a map-based view of location of the particular merchants may be presented in the review.

Returning again to FIG. 2, the changes entered at the portfolio display tool 116 may be recorded via the selection analysis tool 118 and fed back to the ML/AI engine 116 to update the hidden layer values of the engine 114 to provide a more robust recommendation in future analysis activities.

Figure 3:
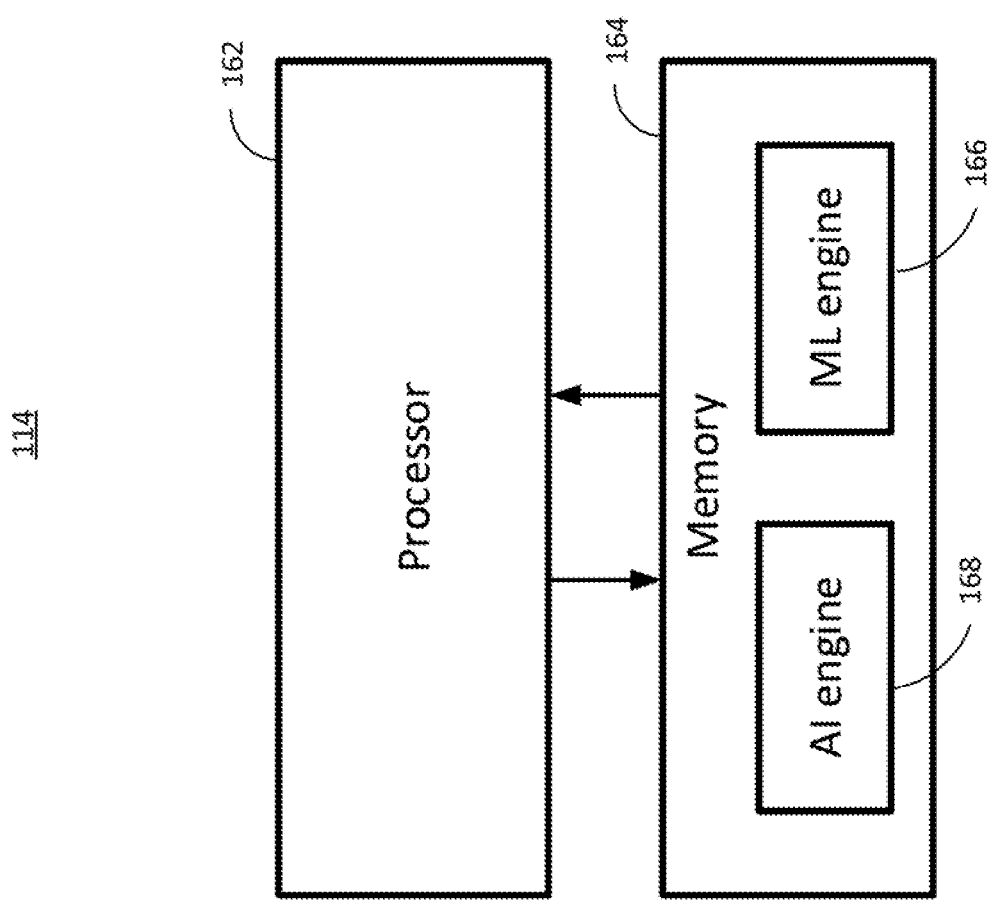
FIG. 3 is a block diagram of machine learning (ML) and artificial intelligence (AI) engines.
Figure 4:
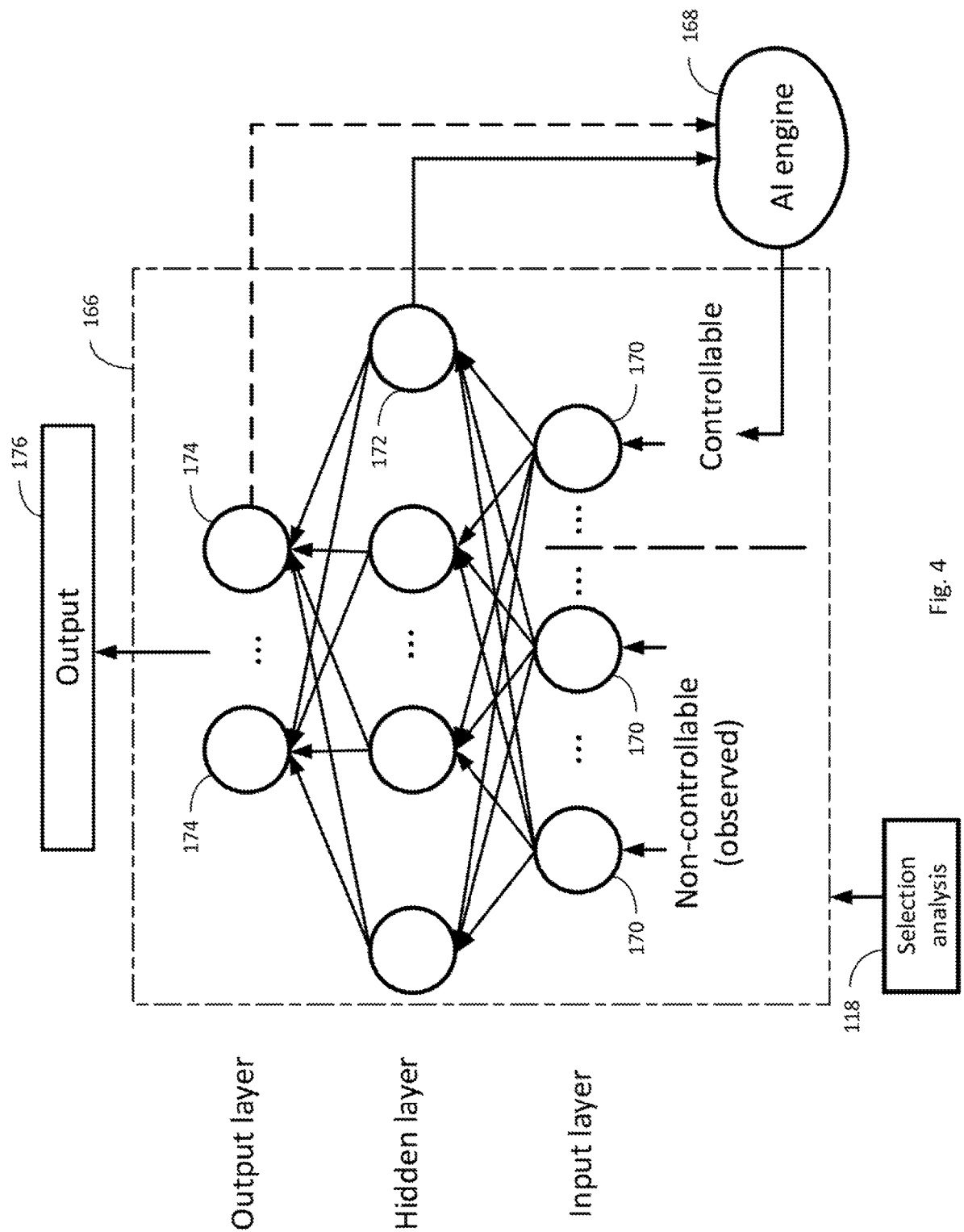
FIG. 4 is block diagram illustrating an embodiment of ML and AI engines in accordance with the current disclosure.
Figure 5:
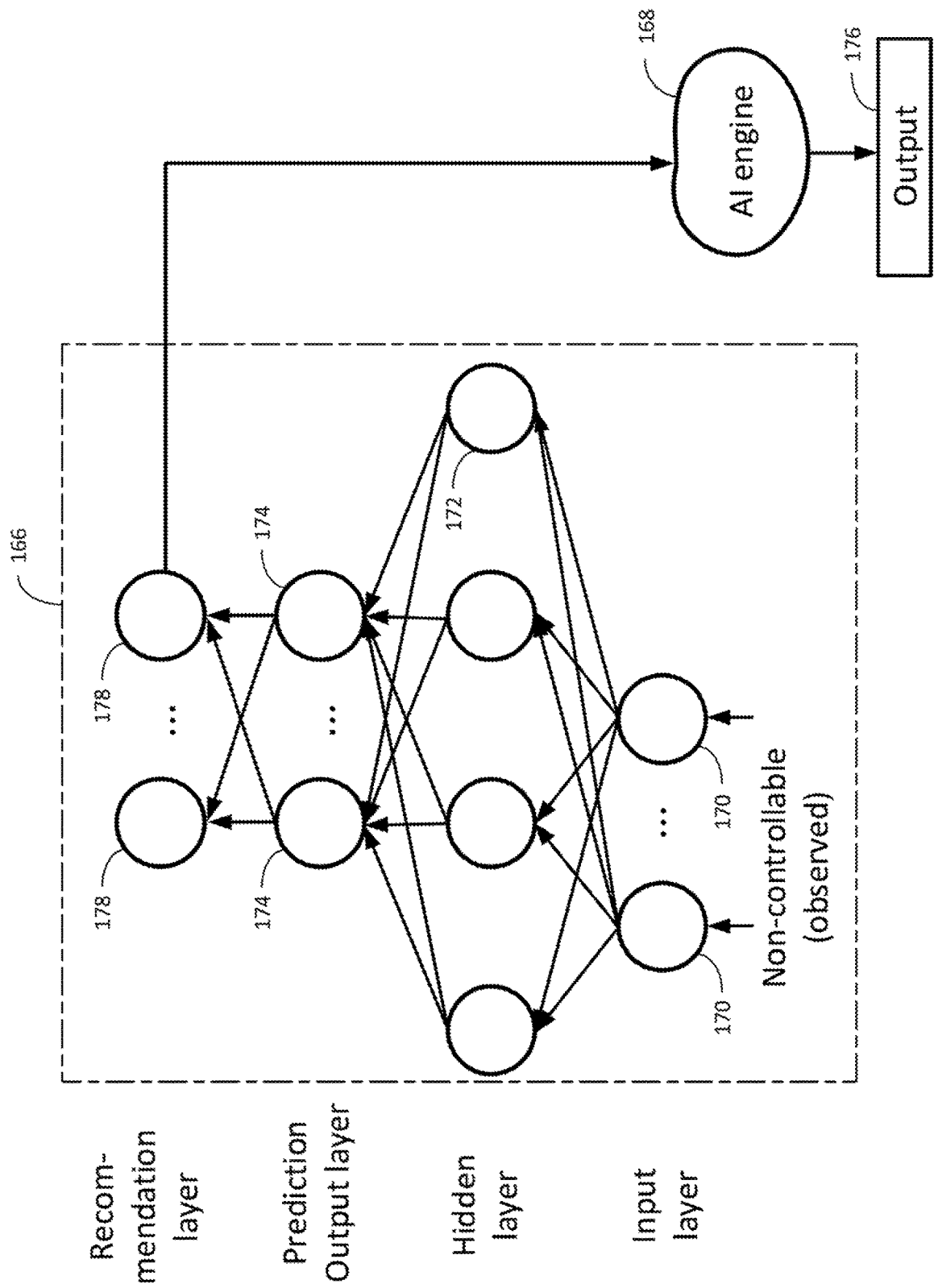
FIG. 5 is block diagram illustrating an alternate embodiment of ML and AI engines in accordance with the current disclosure.

The training and updating of the engine 116 is discussed in more detail in FIGS. 3-5. FIG. 3 is a simplified and representative diagram of a processor-based ML/AI engine 114. The engine 114 may include a processor 162 and memory 164 coupled by a data bus. The engine 114 functions may be split between an ML engine 166 and an AI engine 166. Similarly, as mentioned previously, the engine 114 may be remote or may be local or may be a combination of local and remote.

FIG. 4 illustrates one architecture for configuring the ML engine 166 and AI engine 168. An input layer 170 may receive both controllable and non-controllable inputs. A non-controllable input may include those data that are observed and not subject to change. In this case, the current portfolio of the acquirer 20 may be included in the non-controllable inputs. In some cases, geographic region restrictions may also be included as non-controllable inputs. However, in some case, changes to the geographic region may be allowed as controllable inputs to broaden the scope of recommendations. The controllable inputs may include proposed categories and their corresponding statistics as discussed more below. In practice, the ML engine 166 may have additional nodes in each layer. The input layer 170 may expect the inputs in a given format or data structure or the input layer 170 may be able to parse the data into a format it can use.

The collective inputs may drive a hidden layer in the ML engine 166 that has nodes which weight each input in a comparative manner to drive an output layer 174 used to formulate an output 176. A learning process is used to weight the hidden layer values to provide acceptable outputs for a wide variety of input conditions. The training process may include thousands of samples that may be evaluated by a human observer to grade the quality of the result.

The AI engine 168 may receive data from the databases 60 to formulate new proposals for ML engine 166 to process into ideal portfolio mixes. In some cases, the hidden layer 172 may provide feedback to the AI engine 168 while in other cases, the output layer may also provide feedback to the AI engine 168. The AI engine 168 may evaluate the available candidates for selection based on characteristics of the acquirer, for example, regional preferences. That is, the field of merchant categories available to a very large processor may not be available to a smaller, regional processor. Therefore, the controllable inputs to the system may need to be selected based on heuristics associated with the acquirer 20. As shown in FIG. 3, selections made by evaluators at a selection process 118 may be provided for on-going training of the ML engine 166.

Other configurations of ML engine 166 and AI engine 168 may be built. For example, a second instance of an ML engine or an additional layer may be used to evaluate the predicted results from the observed inputs 170 in order to generate suggested offers to the AI engine 168. One such embodiment is shown in FIG. 5. As illustrated, a second output layer with outputs 178 may be used to generate category recommendations to the AI engine 168, which in turn, generates updated idealized portfolios.

Figure 6:
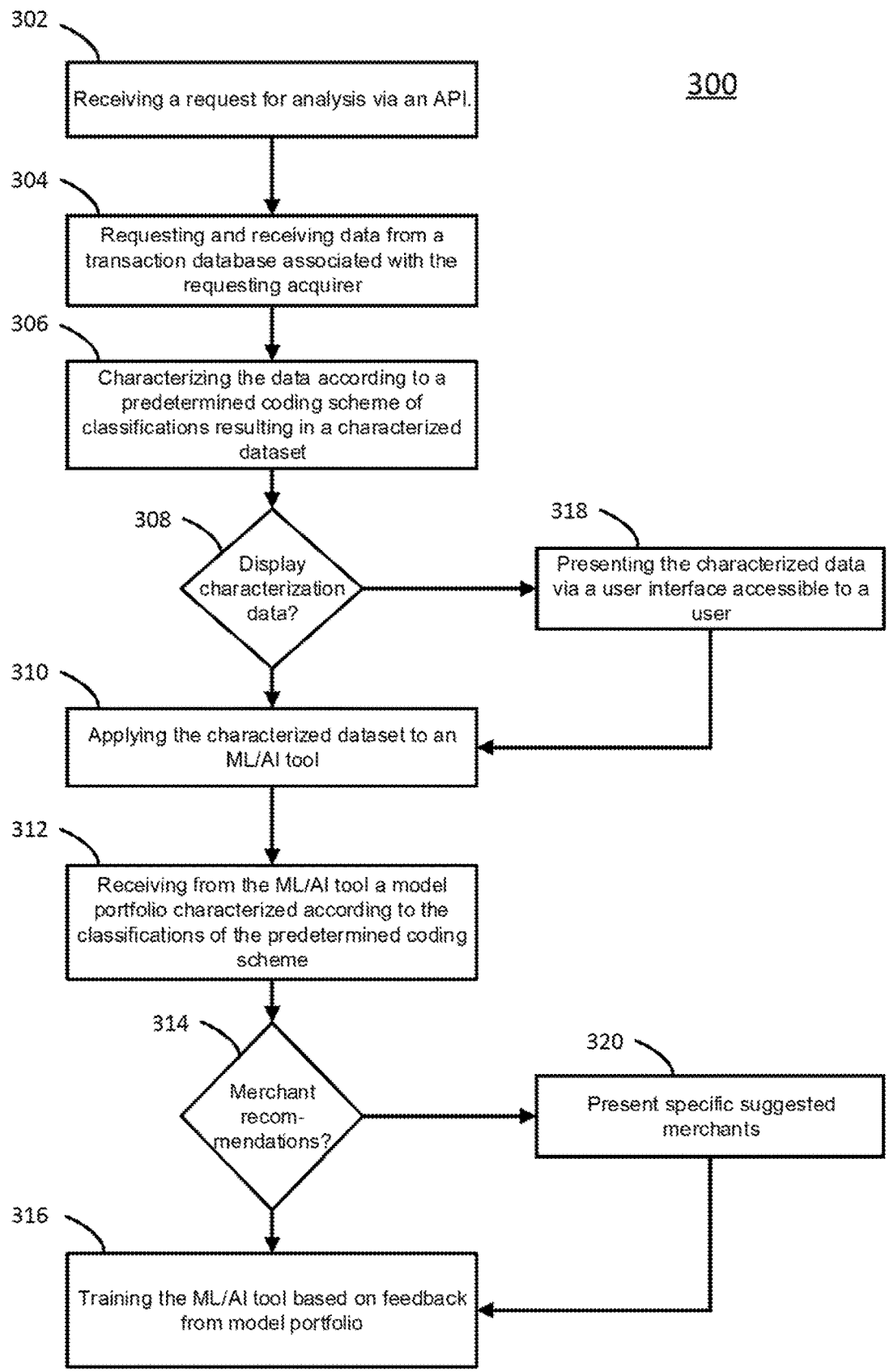
FIG. 6 is a flowchart of a method of generating a model portfolio using an intelligent diversification tool.

FIG. 6 is a flowchart of a method 300 of utilizing an ML/AI engine 166 to process analytical data associated with transaction processing. In an embodiment, an ML/AI engine 166 may be trained to provide ideal portfolio recommendations. The training may involve seeding the engine 166 with initial portfolios, that is, non-optimized portfolios and then critiquing the resulting recommendation, often as simply as agreeing or disagreeing with the recommendation. In this way the engine 166 learns what a good portfolio looks like and may learn how to select from available categories to develop an optimized portfolio having improved value and risk characteristics.

At block 302, a request may be received from an acquirer via an application program interface (API) 120 that supports, for example, a REST data access protocol. The request may initiate a process at the IDT 100 for an analysis of the acquirer's portfolio. The request may also include a range of dates over which to acquire data. In an embodiment, the IDT 100 may use all available data for the acquirer's current set of merchants. That is, the IDT 100 may gather transaction data using the acquirer's current portfolio and gather historical data back to a point when the mix of acquirer accounts changes. This may help ensure that the maximum amount of data is used for the analysis while avoiding tainting the data with merchant transactions that are no longer part of the acquirer's portfolio.

The transaction history for the acquirer's current accounts may be received from the merchant transaction database 102 at block 304. The data resulting from this query response may include longitudinal data for a transaction including not only the date and value of the transaction but also whether it was disputed, refunded, or identified as fraudulent.

The data may be characterized at block 306 to extract from the individual transactions relevant values and also to categorize the merchants according to a predetermined code scheme. In one embodiment, the coding may use the well-known merchant classification code (MCC) that allows various merchants to be classified by their type of business such as retail, gambling, food, fuel, etc. Each merchant is generally assigned an MCC classification when the merchant initiates payment processing with its bank. Logically, other classification schemes are possible and are contemplated.

After the merchant transaction data is characterized, optionally at block 308, the characterized data may be formatted and provided or made available to the acquirer 20 via the API 120 for display at an acquirer system (not depicted). In various embodiments, the displayed data may be in tabular form as shown in FIG. 7 or may be shown in graphical form as illustrated in FIG. 8.

The data from the characterization may, at block 310, be applied to the non-controllable inputs of the ML engine 166, initiating the recommendation processing by the IDT 100. As discussed above, the recommendation processing may include limiting certain of the input data received from the market database in view of demographic limitations associated with the acquirer including but not limited to geographic restrictions or merchant-type preferences such as non-tobacco. In an embodiment, a recommended portfolio may be assessed to determine if it meets a minimum criteria, for example, for fraud level as a percentage of total transaction value. If not, an output of the ML engine 166 may be fed to the AI engine 168 to change one or more controllable inputs. For example, a geographic restriction may be eased, or categories not previously included may be added to help improve the overall recommendation.

After processing, with or without optimization, at block 312 the ML engine 166 may provide an output 176 via the API 120 to the acquirer 20 categorized using the same classification system used for the input data, in the exemplary case, using MCC classifications. The output may be formatted for graphic display, such as an XML-formatted data file. One illustrative example of displaying the results is shown in FIG. 9. The output may be adjusted and customized by a user to provide the output in a format that is useful to the user. For example, in some embodiments, a human authority may review the output. In other embodiments, another computer application may use the output and the expansive graphics may not be necessary.

In some cases, the output information may include specific merchant suggestions that a chief risk officer or business development manager can use for creating a plan to change the acquirer's merchant base to a lower risk and/or higher reward mix. For example, if a category is suggested for improving an acquirer portfolio with a given target value, such as 8% of volume, the AI engine may select one or more merchants from that category that can provide that target value. As discussed above, the merchants may be selected to include only those that are not already served by the ecosystem associated with the IDT 100. The selection may be made automatically using an algorithm or may be made in response to user input in a user interface designed to receive guidance.

In an embodiment, a reviewer at the acquirer 20 may provide feedback on the results generated by the IDT 100. A user interface may be designed and used to make the providing of feedback simple and straightforward. At block 314, that feedback may be provided back into the ML engine 166 so that future output from the IDT 100 may more closely reflect the desires of the acquirer 20.

One technical effect of the system is an improved data access mechanism tying the acquirer and multiple databases to the intelligent diversification tool 100. That is, the API 120 improves access for the acquirer 20 to both its own data, illustrated by the generation of the as-is information but also provides valuable access to a market-wide database 104 that was previously unavailable. In addition, the use of the ML engine 166 coupled to the AI engine 168 solves a technological problem of placing constraints on input data for a machine learning tool trained to provide one result. That is, unlike a typical ML implementation where inputs are provided and an output is generated, the AI engine 168 may operate on the available market data in view of acquirer 20 demographics and preferences to limit the available output to meet those demographic and preference requirements.

A system and method in accordance with the current disclosure benefits acquirers by providing access to data from a base of information previously not available to any single acquirer. The suggested portfolio may be based not only on the acquirers current portfolio of merchants but may also be based on demographic preferences including geographic region.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

What is claimed is:

1. A system for generating a recommended merchant category portfolio for an acquirer from a current portfolio of merchants of the acquirer, comprising:
  a processor and memory hosting an artificial intelligence (AI) engine;
  a transaction database storing transaction data for transactions processed by the acquirer involving merchants in the current portfolio;
  an as-is analysis processor coupled to the processor and memory, the as-is analysis processor being configured according to computer-executable instructions for:
    generating a request for the transaction data from the transaction database,
    receiving the requested transaction data from the transaction database,
    characterizing the transaction data according to merchant category classifications resulting in a characterized dataset, and
    applying the characterized dataset as input to a machine learning/artificial intelligence (ML/AI) tool;
  a market database storing market data derived from merchant transactions outside of the acquirer's current portfolio;
  the ML/AI tool coupled to the as-is analysis processor and the market database and configured according to computer-executable instructions for:
    receiving the characterized dataset from the as-is analysis processor,
    receiving the market data from the market database,
    generating an output of a recommended merchant category portfolio based on the characterized dataset and the market data, the recommended merchant category portfolio including recommended merchant category classifications,
    assessing the recommended merchant category portfolio based on one or more acquirer-specified criteria of the merchant category classifications in the recommended merchant category portfolio, and
    if the recommended merchant category portfolio does not meet the one or more acquirer-specified criteria, changing the input of the market data via to the ML/Ai tool via the AI engine and repeating the generating of the output of the merchant category portfolio until the one or more acquirer-specified criteria are met; and
  a user interface associated with a computer of the acquirer, the user interface being configured to receive the recommended merchant category portfolio from the ML/AI tool and display the recommended merchant category portfolio, the recommended merchant category portfolio including a percentage contribution of each merchant category classification in graphical or tabular form.

2. The system of claim 1, further comprising an application program interface (API) through which the recommended merchant category portfolio is communicated from the ML/AI tool to the user interface.

3. The system of claim 1, wherein the acquirer-specified criteria include at least one or fraud rate and chargeback rate.

4. The system of claim 1, wherein the as-is analysis processor is further configured according to computer-executable instructions for characterizing the transaction data according to an MCC merchant classification standard.

5. The system of claim 1, wherein the as-is analysis processor is further configured according to computer-executable instructions for formatting the characterized dataset to a graphical display format, and presenting the formatted characterized data set to the user interface of the acquirer via an application program interface (API).

6. The system of claim 1, wherein the as-is analysis processor is further configured according to computer-executable instructions for specifying a date range for the transaction data in the request.

7. The system of claim 1, wherein ML/AI tool is further configured according to computer-executable instructions for assigning one or more recommended merchants by name to at least one merchant category classification of the recommended merchant category portfolio.

8. An intelligent diversification tool for generating a recommended merchant category portfolio for an acquirer from a current portfolio of merchants of the acquirer, the intelligent diversification tool comprising:
   a processor and memory hosting an artificial intelligence (AI) engine;
   a transaction database storing transaction data for transactions processed by the acquirer involving merchants in the current portfolio;
   an as-is analysis processor coupled to the processor and memory, the as-is analysis processor being configured according to computer-executable instructions for:
      generating a request for the transaction data from the transaction database,
      receiving the transaction data from the transaction database,
      characterizing the transaction data according to merchant classification codes of merchants in the transaction data resulting in a characterized dataset, and
      applying the characterized dataset as input to an machine learning/artificial intelligence (ML/AI) tool,
   a market database storing market data derived from merchant transactions outside of the acquirer's current portfolio,
   the ML/AI tool coupled to the as-is analysis processor and the market database and configured according to computer-executable instructions for:
      receiving the characterized dataset from the as-is analysis processor,
      receiving the market data from the market database,
      generating an output of a recommended merchant portfolio based on the characterized dataset and the market data, the recommended merchant portfolio including recommended category classifications,
      assessing the recommended merchant portfolio based on one more acquirer-specified criteria, and
      if the recommended merchant portfolio does not meet the one or more acquirer-specified criteria, changing the input of the market data to the ML/AI tool via the AI engine and repeating the generating of the output of the recommended merchant portfolio until the one or more acquirer-specified criteria are met; and
   a user interface associated with a computer of the acquirer, the user interface being configured to receive the recommended merchant portfolio from the ML/AI tool and display the recommended merchant portfolio, the recommended merchant portfolio including a list of recommended merchants in tabular form.

9. The intelligent diversification tool of claim 8, wherein the user interface is configured to receive the recommended merchant portfolio from the ML/AI tool via an application program interface (API).

10. The intelligent diversification tool of claim 8, wherein the acquirer-specified criteria include at least one of fraud rate and chargeback rate of the merchant category classifications in recommended merchant portfolio.

11. The intelligent diversification tool of claim 8, wherein the ML/AI tool is further configured according to computer-executable instructions for formatting the recommended merchant portfolio to a graphical display format and presenting the recommended merchant portfolio via an application program interface (API).

12. The intelligent diversification tool of claim 8, wherein the as-is analysis processor is further configured according to computer-executable instructions for specifying a date range for the transaction data in the request.

13. The intelligent diversification tool or claim 8, wherein the as-is analysis processor is further configured according to computer-executable instructions for specifying a date range for the transaction data based on a duration of a current composition of the current portfolio in the request.

14. The intelligent diversification tool of claim 8, wherein the ML/AI tool is further configured according to computer-executable instructions for assigning one or more recommended merchants by name to at least one merchant category classification of the recommended merchant portfolio.

* * * * *